United States Patent [19]

Fleming

[11] Patent Number: 4,527,910
[45] Date of Patent: Jul. 9, 1985

[54] DUAL CLEARANCE SQUEEZE FILM DAMPER

[75] Inventor: David P. Fleming, North Olmsted, Ohio

[73] Assignee: The United States of America as represented by the Administrator of the National Aeronautics and Space Administration, Washington, D.C.

[21] Appl. No.: 596,960

[22] Filed: Apr. 5, 1984

[51] Int. Cl.³ .............................................. F16C 27/00
[52] U.S. Cl. ...................................... 384/99; 384/101
[58] Field of Search ................ 384/99, 101, 102, 114; 308/184 R, 184 A

[56] References Cited

U.S. PATENT DOCUMENTS

| | | |
|---|---|---|
| 2,003,316 | 6/1935 | Schein . |
| 3,005,668 | 10/1961 | Szydlowski .................. 308/184 |
| 3,212,829 | 10/1965 | Gross . |
| 3,332,726 | 7/1967 | Cooper . |
| 3,782,793 | 1/1974 | Sinner ................................. 384/99 |
| 4,084,861 | 4/1978 | Greenberg et al. ............ 308/184 R |
| 4,175,803 | 11/1979 | Roberts . |
| 4,214,796 | 7/1980 | Monzel et al. . |
| 4,336,968 | 1/1982 | Hibner ................................. 384/99 |
| 4,429,923 | 2/1984 | White et al. .................... 308/184 R |
| 4,457,667 | 7/1984 | Seibert et al. ................... 308/184 R |

Primary Examiner—Lenard A. Footland
Attorney, Agent, or Firm—Gene E. Shook; John R. Manning

[57] ABSTRACT

This invention relates to a dual clearance hydrodynamic liquid squeeze film damper for a gas turbine engine. Under normal operating conditions the device functions as a conventional squeeze film damper, using only one of its oil films. When an unbalance reaches abusive levels, as may occur with a blade loss or foreign object damage, a second, larger-clearance film becomes active, controlling vibration amplitudes in a near-optimum manner until the engine can be safely shut down and repaired.

16 Claims, 4 Drawing Figures

DUAL CLEARANCE SQUEEZE FILM DAMPER

ORIGIN OF THE INVENTION

The invention described herein was made by an employee of the United States Government and may be manufactured and used by or for the Government for governmental purposes without the payment of any royalties thereon or therefor.

TECHNICAL FIELD

This invention is concerned with providing a high degree of damping in a rotor case system of a gas turbine. The invention is further concerned with improving the rotor dynamics of turbine machinery in general.

In the prior art damping is supplied by the squeeze film action of a squeeze damper. Such a damper has the disadvantage of being highly nonlinear in that the stiffness and damping it provides vary with vibrational amplitude. This characteristic often exacerbates the rotor dynamics problem under conditions of high unbalance loads, such as when a blade breaks free from a turbine.

Conventional squeeze film dampers having small clearances are used to control vibrations caused by small residual unbalance in rotors of turbine engines and other rotating machinery. When the unbalance becomes much larger than normal due to loss of turbine or compressor blades, foreign object damage, and the like, a squeeze film damper no longer attenuates unbalance forces. Under conditions of high unbalance, a larger damper clearance is needed.

The ideal damper is one that is linear in that the stiffness and damping coefficients do not change with vibration amplitude. One such device is a curved beam damper which, in theory, should be completely linear. A problem encountered in this damper is that damping effectiveness may be lost if any air is introduced into the damper fluid.

The quasi-linear range of a conventional squeeze film can be enlarged by increasing the damper clearance. This has the disadvantages of requiring the damper to be longer and of less precise radial location of the rotor, possibly allowing rubbing of seal surfaces at engine startup and shutdown. Centering springs of the squirrel cage type are sometimes used in conjunction with squeeze film dampers. The stiffness of these springs is chosen for rotordynamic purposes, and this stiffness is frequently too low for purposes of shaft centerline location. These disadvantages of the conventional squeeze film can be somewhat mitigated by a multiple-shim damper of the type described in U.S. Pat. No. 4,214,796, but the total clearance required may still be larger than desirable.

It is, therefore, an object of the present invention to provide a dual-clearance squeeze film damper which operates as a single-film damper at normal unbalance levels. When unbalance rises because of abnormal conditions, a high clearance portion of the device effectively dampens vibrations and prevents destructive rotor amplitudes and bearing loads.

BACKGROUND ART

Schein U.S. Pat. No. 2,003,316 relates to a means for preventing vibration of high speed vertical shaft rotors wherein, under normal loads, auxiliary bearing blocks are closely positioned symetrically around the rotor shaft to within oil film thickness with respect to the exterior shaft surface. When the bearing is running under normal loads there is practically no clearance between the auxiliary block surfaces and the shaft. However, under heavier than normal loads, spring means will resiliently yield to enable the auxiliary blocks to move to the surface of the main bearings. This substantially increases the clearance space between the bearing shaft surfaces.

Copending application Ser. No. 456,929 by Lawrence P. Ludwig entitled "Multiple Plate Hydrostatic Viscous Damper" describes apparatus directed to damping radial motion of a rotating shaft. The damper comprises a series of spacer plates extending in a radial direction. A hydrostatic piston is utilized to place a load on these plates. Each annular plate is provided with a suitable hydrostatic bearing geometry on at least one of its faces.

DISCLOSURE OF INVENTION

The apparatus of the present invention provides a low clearance damper for normal operation and a high clearance damper which automatically becomes active under high unbalance conditions. The invention relates particularly to a dual clearance hydrodynamic liquid squeeze film damper.

During normal operation, a low clearance bearing is fixed in position by shear pins, and a low clearance film provides the necessary damping. Under such conditions the dual film damper functions in a conventional manner using only one of its oil films.

When the loads increase beyond the design value, the pins shear. This enables the low clearance portion of the bearing to move freely with the journal. Under these abusive levels of unbalance a larger clearance film becomes active. Damping is then obtained predominantly from the high clearance portion of the damper. The high unbalanced forces are effectively attenuated to prevent catastrophic bearing and rotor failures. This feature further provides for limited additional operation or a safe shutdown.

BRIEF DESCRIPTION OF THE DRAWINGS

The objects, advantages and novel features of the invention will be more fully apparent from the following detailed description when read in connection with the accompanying drawings in which.

BEST MODE FOR CARRYING OUT THE INVENTION

Within the limits of its capability, a conventional squeeze film damper effectively controls shaft vibration and bearing loads. For an open end damper with a fully-cavitated ($\pi$) film, the stiffness and damping coefficients are conveniently determined through the short bearing approximation. The following expressions are taken from NASA CR-165503, 1981, entitled "Analysis of High Load Dampers";

$$K = \frac{2\mu RL^3 \omega \epsilon}{C^3(1-\epsilon^2)^2} \quad B = \frac{\pi \mu RL^3}{2C^3(1-\epsilon^2)^{3/2}}$$

In these expressions, K is the damper stiffness coefficient, B is the damping coefficent, C is the damper radial clearance, L is the damper length, R is the damper radius, $\epsilon$ is the damper excentricity ratio (e/C), e is the journal displacement relative to its bearing, and $\mu$ is the damper fluid viscosity.

It is apparent from these expressions that, for small eccentricities, stiffness increases approximately linearly with eccentricity and damping is approximately constant. For eccentricity ratios greater than about one-half, however, the $(1-\epsilon^2)$ term in the denominator of both expressions means that stiffness and damping now increase more rapidly as eccentricity increases. Theoretically, they increase without limit as $\epsilon$ approaches 1. It is this nonlinear property which is responsible for the undesirable characteristics of squeeze film damped rotors at high unbalance loads.

A multi-mass rotor which dynamically simulates a small gas turbine engine is described in a publication entitled "Design of a Squeeze-Film Damper for a Multi-Mass Flexible Rotor", ASME *Journal of Engineering for Industry*, vol. 97, No. 4, November 1975, pages 1383–1389, which was coauthored by the Applicant. Squeeze film damper supports designed for this rotor were sized to handle a distributed unbalance of up to 29 g cm (0.4 oz in) for operation between the first and second critical speeds. For this level of unbalance the vibration amplitude at the center disk of the rotor is shown as the bottom curve 10 in FIG. 1. Amplitude is very well controlled, and is, in fact, nearly identical to what would be obtained with the optimum stiffness and damping coefficients.

Figure 2:
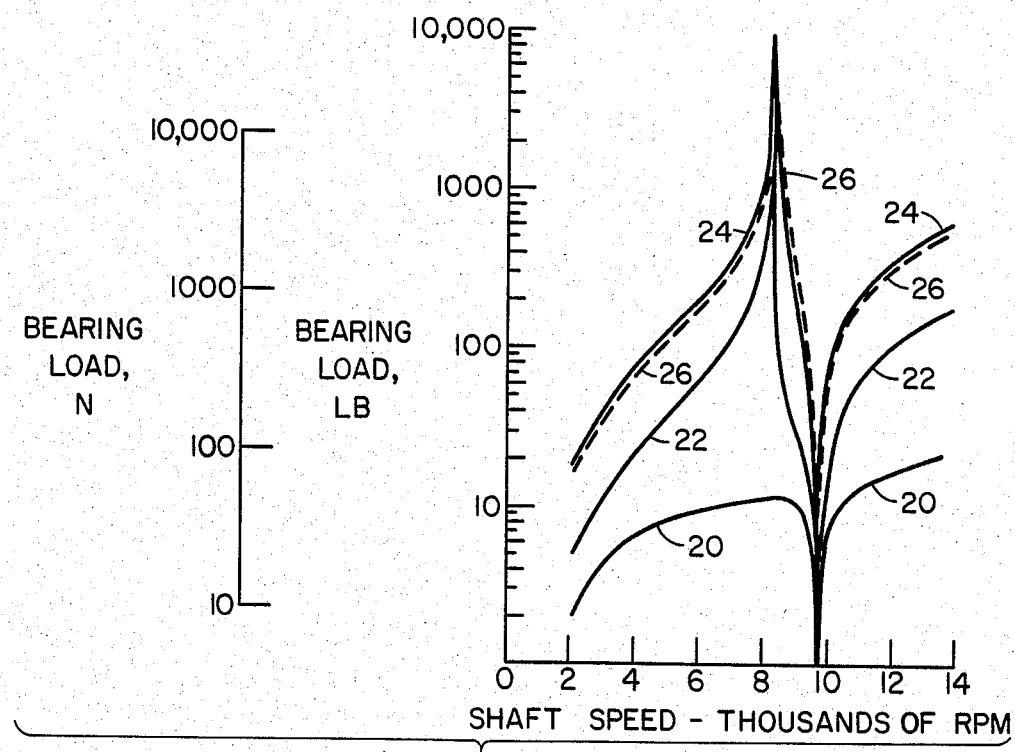
FIG. 2 is a graph showing bearing load plotted against shaft speed.

The rotating load on the bearings due to the 29 g cm unbalance is plotted as the bottom curve 20 in FIG. 2. Again, the results are very similar to those obtained with optimum constant damping and stiffness. The very low load near 10,000 rpm occurs because a nodal point in the rotor mode shape is very near the bearings at that speed.

Figure 1:
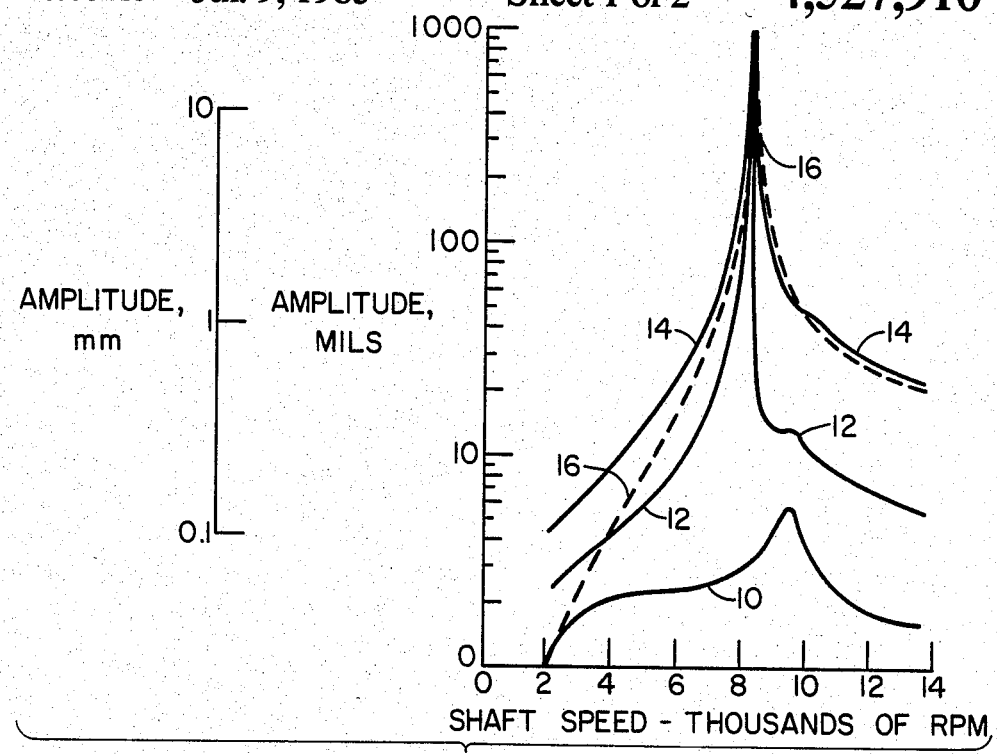
FIG. 1 is a graph showing rotor midspan amplitude plotted against rotor speed for various unbalance conditions.

When the unbalance is increased to 72 g cm (1 oz in), the behavior changes markedly as shown by curves 12 and 22 in FIGS. 1 and 2, respectively. A large peak near 8000 rpm in both vibration amplitude and bearing load is evident from these figures. This speed is the first critical speed of the rotor when the bearings are rigidly supported. The amplitude peak which was prominent near 10,000 rpm for the 29 g cm unbalance shown in FIG. 1 is now almost completely masked.

If the unbalance is further increased to 290 g cm (4 oz in), amplitudes shown by the curve 14 for a single film damper and curve 16 for a rigid support in FIG. 1, as well as bearing loads shown by curve 24 for a single film damper and curve 26 for a rigid support in FIG. 2 also increase further. However, the character of the response changes little from that at 72 g cm unbalance as shown in curves 12 and 22. The damper is nearly bottomed and is almost completely ineffective in controlling vibration. This is evidenced by the response curves being nearly coincident with those for rigidly supported bearings shown as dashed curves 16 and 26 in FIGS. 1 and 2.

Figure 3:
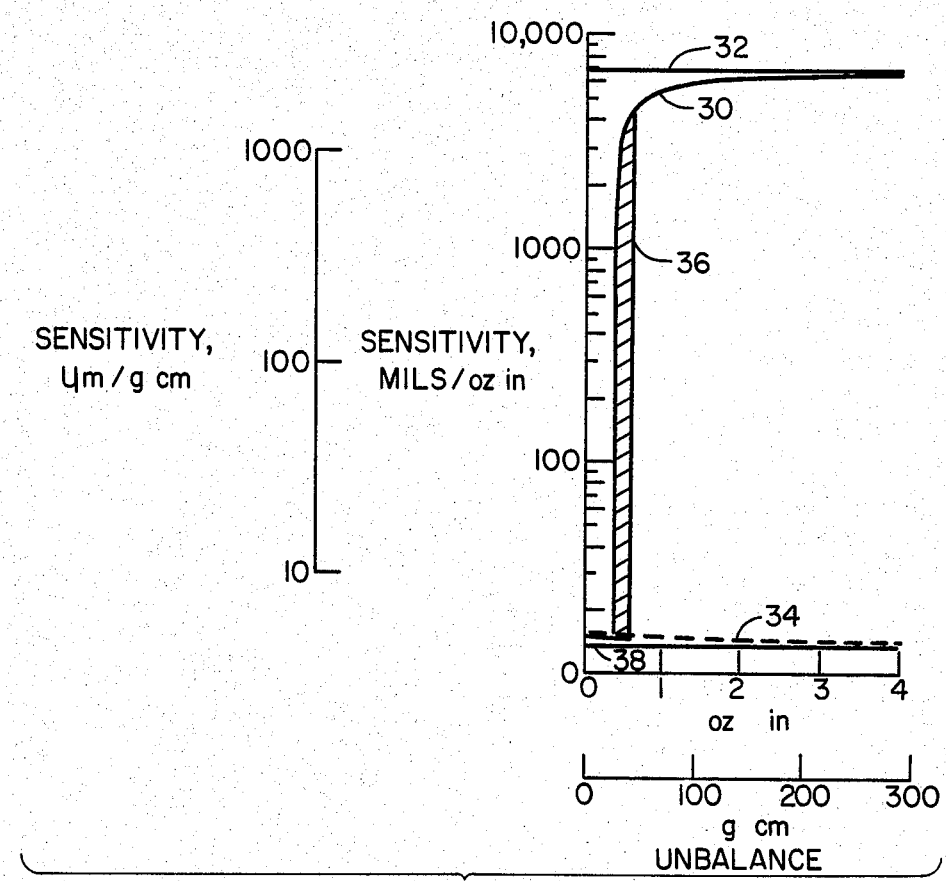
FIG. 3 is a graph showing unbalance sensitivity for various rotor supports.

The maximum vibration calculated over the speed range from 0 to 14,000 rpm is plotted in FIG. 3 as a function of the rotor unbalance. The response has been normalized by dividing by the amount of unbalance to obtain a sensitivity factor. The unbalance sensitivity for a single film damper is illustrated by the curve 30. This sensitivity for a rigid support is illustrated by the curve 32, and the curve 34 shows the sensitivity for a dual film damper. A bistable region for the single film damper is shown at 36. Optimum fixed damping is illustrated by the line 38.

Up to an unbalance of 29 g cm, the sensitivity of the squeeze-film supported rotor is very close to that calculated for optimized constant stiffness and damping coefficients. This optimum does not change with unbalance. From about 29 to 43 g cm (0.6 oz in), there are two stable solutions for the rotordynamic equations of motion. In this bistable region 36, the rotor can operate stably at either of two conditions, high or low amplitude. It is possible to increase speed to the rigid-support critical speed and operate at low amplitude. If, however, the rotor is disturbed by an outside force, it may "jump up" to the high amplitude solution.

Above an unbalance of 43 g cm the high amplitude response is the only solution near the critical speed. Both amplitude and bearing load are very nearly as high as for rigidly supported bearings. Amplitudes and loads approaching these predicted values would obviously prove catastrophic to the machine involved.

Figure 4:
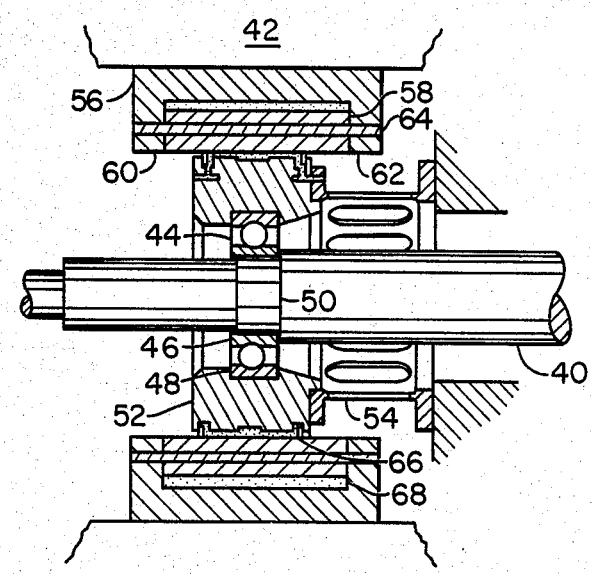
FIG. 4 is a vertical section view of a dual clearance damper constructed in accordance with the present invention.

Referring now to FIG. 4, there is shown a dual clearance damper constructed in accordance with the present invention. A shaft 40 rotates about its longitudinal axis in a stationary housing 42. The shaft 40 may carry the spindle of a gas turbine engine of the type shown in U.S. Pat. No. 3,581,492.

The shaft 40 extends through a suitable bearing 44 which may be of the anti-friction type. A ball bearing may be used which has an inner race 46 and an outer race 48.

The inner race 46 engages a suitably machined portion 50 on the shaft 40. The outer race 48 engages a damper journal 52 flexibly attached to the housing 42 by a suitable damper centering spring 54. Rotation of the journal 52 about the shaft 40 is prevented by the spring 54.

According to the present invention, damping means including a ring member 56 is mounted in the housing 42 for operable engagement with the bearing 44 through the journal 52. This damping structure includes a low-clearance portion in the form of an annular ring forming a sleeve 58 which encircles the bearing 44. The sleeve 58 is rigidly mounted between a pair of annular protrusions 60 and 62 which extend from the ring 56 toward the shaft 40.

An important feature of the invention is the utilization of a plurality of shear pins 64 to secure the sleeve 56 to the protrusions 60 and 62. The pins 64 are designed to shear under a predetermined force as explained below in greater detail.

A predetermined spacing between the inner surface on the sleeve 58 and the outer surface of the journal 52 is minimal. An inner damper film 66 is formed by a suitable fluid lubricant in this space to provide a low clearance damper for operation under normal conditions.

A predetermined spacing between the inner surface on the ring 56 between the protrusions 60 and 62 and the outer surface of the sleeve 58 is usually much greater than the spacing between the inner surface of the sleeve 58 and the journal 52. An outer damper film 68 formed by a suitable fluid lubricant in this space provides a high clearance damper under abnormal conditions.

Under normal operation the low clearance bearing is fixed in position by the shear pins 64. The inner damper film 66 provides the necessary damping. When loads increase beyond the design value, the pins 64 shear. This enables the sleeve 58 to move within the outer damper film 68.

The dual clearance damper shown in FIG. 4 maintains close control of rotor radial location during normal operation when the rotor is well balanced. It also maintains control of vibration amplitudes and bearing loads during operation above the critical speed with high unbalance. This damper further provides for safe deceleration through critical speeds with high unbalance. In operation, the damper relies on the two squeeze films 66 and 68 operating in series. During normal operation, the sleeve 58 separating these two damper films is fixed in place by the shear pins 64 as explained above. Only the inner film 66 is active, and its behavior is then identical to that of the single film damper. The clearance is only as high as is required for the rotor unbalance likely to occur in normal operation; thus, the rotor radial location can be closely controlled.

In the event of rotor blade loss or some other occurrence which increases the unbalance, the damper load rises until the strength of the shear pins 64 is exceeded. The pin 64 shears, enabling the sleeve 58 to move and activate the outer damper film 68. The two films 66 and 68 then operate in series; that is, the bearing load is transmitted first through the inner film 66, then through the sleeve 58 and outer film 68 to the machine structure 42. The outer film 68 will generally have a larger clearance than the inner film in order to accommodate the larger amplitude of motion necessarily accompanying the higher unbalance. The inner and outer dampers will continue to operate together until the unbalance is corrected and new shear pins installed.

Oil supply passages are not shown in FIG. 4. However, oil is typically supplied through a feed hole in the outer side of the outer film. The inner damper receives its oil from the outer damper via a feed hole in the sleeve 58. The outer damper shown is of the closed end type. It was found that a shorter length for the damper would suffice for the closed end damper than for an open end damper.

While a preferred structure of the invention has been shown and described, it will be appreciated that various structural modifications may be made to the disclosed structure without departing from the spirit of the invention or the scope of the subjoined claims. By way of example, it may be desirable to use an antirotation pin instead of the centering spring 54. Such a pin does not provide radial restraint.

I claim:

1. Apparatus for damping radial motion of external excitation on a shaft rotating about its longitudinal axis in a stationary housing comprising
a non-rotating journal encircling said rotating shaft,
bearing means within said journal extending around said shaft, said bearing means including
a rotatable inner portion mounted on said shaft rotation therewith, and
a non-rotatable outer portion rigidly secured to said journal and extending around said inner portion and spaced therefrom,
a first annular ring member encircling said journal and spaced therefrom a first predetermined distance to provide a low clearance damper for operation under normal conditions,
a second annular ring member encircling said first ring member and spaced therefrom a second predetermined distance greater than said first predetermined distance, said second annular ring member being rigidly mounted relative to said housing, and
means for selectively securing said first annular ring member to said second annular ring member during said normal conditions, said means being operable to release said first annular ring member under a predetermined force so that said second predetermined distance provides a high clearance damper under abnormal conditions.

2. Apparatus for damping radial motion as claimed in claim 1 wherein said selective securing means comprises at least one shear pin secured to both said first and second annular rings.

3. Apparatus for damping radial motion as claimed in claim 2 including
a plurality of spaced protrusions extending from said second annular ring toward said shaft, said first annular ring being positioned in the space between said protrusions, and
each of said shear pins extending between said protrusions through said first annular ring.

4. Apparatus for damping radial motion as claimed in claim 1 including
a first fluid lubricant in the spaces between said first annular ring and said journal for forming a first squeeze film.

5. Apparatus for damping radial motion as claimed in claim 4 wherein the first fluid lubricant is oil.

6. Apparatus for damping radial motion as claimed in claim 1 including
a second fluid lubricant in the space between said first annular ring and said second annular ring for forming a second squeeze film.

7. Apparatus for damping radial motion as claimed in claim 6 wherein the second fluid lubricant is oil.

8. In apparatus for damping radial motion resulting from excitation loads on a rotating shaft extending through a nonrotating journal and operably carried thereby, the improvement comprising
a first annular ring member encircling said journal and spaced therefrom a first predetermined distance to provide a low clearance damper for operating under normal conditions,
at least one second annular ring member encircling said first annular ring member and spaced therefrom a second predetermined distance greater than said first predetermined distance, and
means for securing said first annular member to said second annular ring member under normal conditions and releasing said first annular ring member under abnormal conditions.

9. Apparatus for damping radial motion as claimed in claim 8 wherein said securing means comprises at least one shear pin secured to both said first and second annular ring members.

10. Apparatus for damping radial motion as claimed in claim 9 including
a plurality of spaced protrusions extending from said second annular ring toward said shaft, said first annular ring being positioned in the space between said protrusions, and each of said shear pins extending between said protrusions through said first annular ring.

11. Apparatus for damping radial motion as claimed in claim 8 including
a first fluid lubricant in the space between said first annular ring and said journal for forming a first squeeze film.

12. Apparatus for damping radial motion as claimed in claim 11 wherein the first fluid lubricant is oil.

13. Apparatus for damping radial motion as claimed in claim 8 including
a second fluid lubricant in the space between said first annular ring and said second annular ring for forming a second squeeze film.

14. Apparatus for damping radial motion as claimed in claim 13 wherein the second fluid lubricant is oil.

15. A dual-clearance hydrodynamic liquid squeeze film damper for damping radial motion of a shaft rotating about its longitudinal axis comprising, a low clearance damping film means encircling said shaft for damping radial motion caused by unbalance forces below a predetermined magnitude, a high clearance damping film means encircling said low clearance damping film means for damping radial motions caused by high unbalance forces exceeding said predetermined magnitude, and means for maintaining said low clearance damping film means in a fixed position when said unbalance forces are below said predetermined magnitude, said means enabling said low clearance damping film means to move freely with said high clearance film bearing when said forces exceed said predetermined magnitude.

16. A dual-clearance damper as claimed in claim 15 including
a plurality of shear pins for maintaining said low clearance damping film means in a fixed position.

* * * * *